United States Patent Office 3,798,219
Patented Mar. 19, 1974

3,798,219
3-(METHYLSULFINYL)CINNOLINONES AND THEIR DERIVATIVES
Maximilian von Strandtmann, Rockaway, John Shavel, Jr., Mendham, Sylvester Klutchko, Hackettstown, and Marvin Cohen, New Milford, N.J., assignors to Warner-Lambert Company, Morris Plains, N.J.
No Drawing. Filed Oct. 18, 1971, Ser. No. 190,293
Int. Cl. C07d 51/08
U.S. Cl. 260—250 A                11 Claims

ABSTRACT OF THE DISCLOSURE 3-substituted cinnolinones having the following structural formula are disclosed:

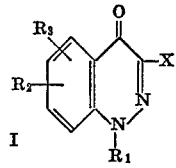

wherein $R_1$ is hydrogen, lower alkyl, aralkyl or acyl and $R_2$ and $R_3$ are hydrogen, halogen, lower alkoxy or lower alkyl, and X is

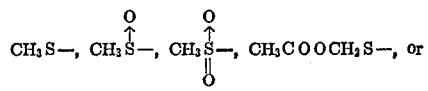

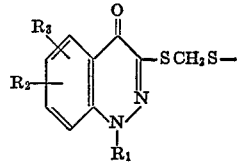

These compounds are useful as immunosuppressants.

The present invention relates to 3-substituted cinnolinones having the following structural formula:

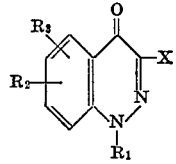

wherein $R_1$ is H, lower alkyl, aralkyl or acyl and $R_2$ and $R_3$ are hydrogen, halogen, lower alkoxy or lower alkyl, and X is

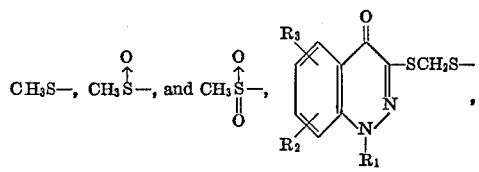

and $CH_3COOCH_2S—$

In the above definitions for $R_1$, $R_2$ and $R_3$ the term "lower alkyl" and the "alkyl" portion of lower alkoxy is meant to contain from 1 to 6 carbon atoms such as methyl, ethyl, propyl, isopropyl and the like.

The term "aralkyl" is meant to be those groups such as phenyl lower alkyl, typically benzyl, phenethyl and the like.

The term "acyl" includes lower alkanoic acids from 1 to 6 carbons, typically acetic, propionic, and the like.

The compounds of this invention exhibit potent immunosuppressant activity in a mammalian host. For example, when they are tested in accordance with the procedure described by Jerne, et al., in "Cell-Bound Antibodies," page 109, Wistar Institute Press, Philadelphia, Pa. (1963), they are capable of inhibiting 90% of the antibody formation at a dose level of 100 mg./kg. intraperitoneally in rodents such as rat, guinea pig and the like.

These compounds are indicated as inhibitors of autoimmune responses; for example, in tissue or organ transplants where it is desirable to inhibit the host's immune responses. The dosage level is about 100 mg./kg. body weight by intramuscular injection.

In order to use these compounds they are formulated with pharmaceutically acceptable diluents such as water for injection, sesame oil, and the like, by well known methods to the art into dosage forms suitable for intramuscular injection.

The above compounds are prepared in accordance with the following reaction scheme:

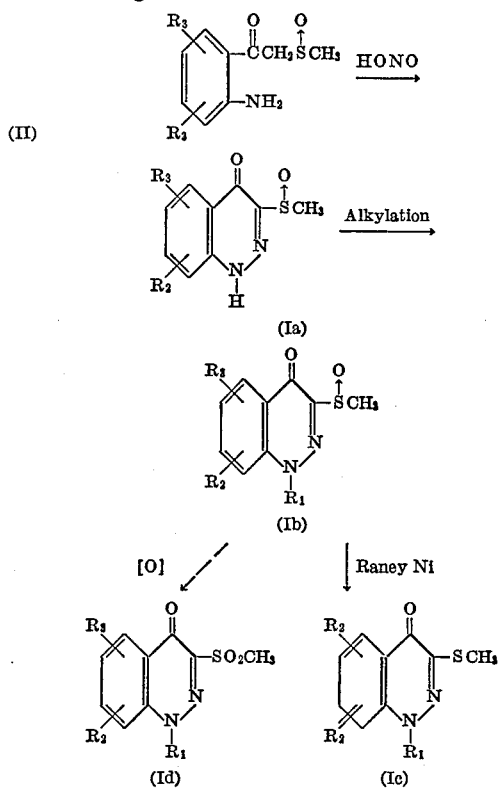

Broadly speaking, starting compounds of Type II are diazotized to yield compounds of Type Ia. Subsequent alkylation by well known methods yields those compounds of the invention corresponding to structure Ib. Oxidation of Ib with per acids yields the sulfones Id and the reduction of Ib with Raney nickel gives the methylthio derivatives, Ic.

The compounds of the invention corresponding to structures Ia and Ib above undergo Pummerer rearrangement in presence of an acid anhydride to give products of type Ie.

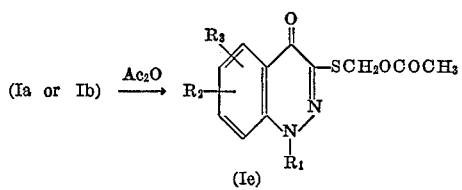

Compounds of Type Ie, upon refluxing with aqueous mineral acid are converted to compounds of type If.

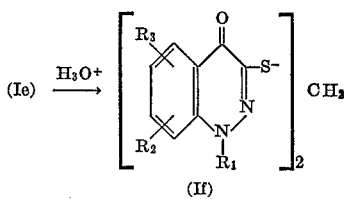

Starting materials of Type II are prepared as follows:

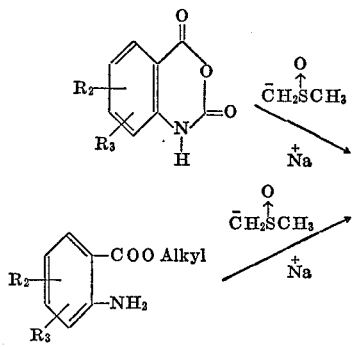

The starting materials for Compound II are in turn obtained from the following sources: isatoic anhydrides from Maumee Chemical Co., Toledo, Ohio; dimethylsulfoxide from Crown-Zellerbach Corp., Camas, Washington; NaH from Metal Hydrides, Inc., Beverely, Mass.; ethyl 2-amino-4,5-dimethoxybenzoate was prepared according to Matsmoto, Ber., 11, 135.

In order to further illustrate the practice of this invention, the following examples are included:

Part A—The preparation of starting material of Type II, Examples 1 through 5.

Part B—Preparation of final products, Examples 6 through 22.

EXAMPLE 1

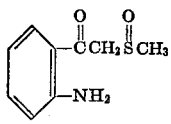

2'-amino-2-(methylsulfinyl)acetophene

Preparation of dimethylsulfoxide anion: A mixture of 150 ml. of dimethylsulfoxide, 350 ml. of benzene and 12.7 g. (0.3 mole) of 57% sodium hydride-mineral oil dispersion is heated at 70–75° C. for one hour with stirring under nitrogen. The resulting solution is cooled to 30° C.

A quantity of 16.3 g. (0.1 mole) of isotonic anhydride is added portionwise over a period of five minutes. The temperature rises to 45° C. and is kept at 40–45° C. with mild cooling during the addition. The yellow-green solution is allowed to cool over a period of one-half hour when ether is added to two liters volume. The resulting precipitate is filtered off (hygroscopic), washed well with ether, dried somewhat and dissolved in 100 ml. of water. The solution is treated with 15 g. (0.25 mole) of glacial acetic acid. Decarboxylation is spontaneous with evolution of carbon dioxide. After several minutes, solid potassium carbonate is added to neutralize and then to saturate the solution. The separated oil is extracted into 250 ml. of ethyl acetate and the solution is dried (potassium carbonate) filtered and concentrated to give 10.9 g. (55.3%) of a solid melting at 100–102° C. The crude is recrystallized from ethyl acetate to give pure yellow crystals melting at 101–103° C.

*Analysis.*—Calcd. for $C_9H_{11}NO_2S$ (percent): C, 54.80; H, 5.62; N, 7.10. Found (percent): C, 55.05; H, 5.71; N, 7.15.

EXAMPLE 2

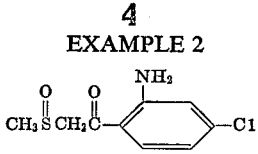

2'-amino-4'-chloro-2-(methylsulfinyl)acetophenone

This compound was prepared by reacting a solution of 13.2 g. of NaH (57%) in a mixture of 180 ml. of DMSO and 360 ml. of benzene with 16.8 g. of methyl 4-chloroanthranilate (J.A.C.S. 68, 1287 (1946) Lutz, et al.) in analogous fashion to 2'-amino-4',5'-dimethoxy-2-(methylsulfinyl)acetophenone. The material was recrystallized from abs. ethanol, M.P. 129–32°; yield 15 g. (72%).

*Analysis.*—Calcd. for $C_9H_{10}ClNO_2S$ (percent): C, 46.65; H, 4.35; S, 13.84. Found (percent): C, 46.56; H, 4.40; S, 13.87.

EXAMPLE 3

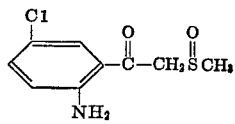

2'-amino-5'-chloro-2-(methylsulfinyl)acetophenone

To a mixture of 600 ml. of benzene and 300 ml. of DMSO was added 22 g. of sodium hydride (55% suspension in mineral oil). The mixture was heated at ca. 75° on a water bath under a stream of nitrogen for 1.5 hr., and the clear solution cooled to 25° in an ice bath. The bath was removed and 29.4 g. of 6-chloroisatoic anhydride was added. The temperature rose to 45°. The solution was stirred for 45 minutes and then diluted to ca. 2500 ml. with anhydrous ether. The precipitate was filtered off, washed with anhydrous ether, and dissolved in 175 ml. of $H_2O$. The solution was treated with 75 ml. of glacial acetic acid, and saturated with $K_2CO_3$. A yellow precipitaate formed. This was filtered, washed with cold $H_2O$, and recrystallized from $CH_3CN$, M.P. 143–45°; yield 15 g. (43%).

*Analysis.*—Calcd. for $C_9H_{10}ClNO_2S$ (percent): C, 46.65; H, 4.35; N, 6.05; S, 13.85. Found (percent): C, 46.93; H, 4.35; N, 6.30; S, 13.68.

EXAMPLE 4

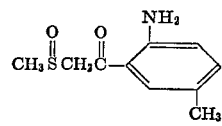

2'-amino-5'-methyl-2-(methylsulfinyl)acetophenone

This compound was prepared by reacting a solution of 44 g. of NaH (57%) in a mixture of 600 ml. of DMSO and 1200 ml. of benzene with 50 g. of methyl 5-methyl anthranilate (J. Med. Chem. 11, 500) in analogous fashion to 2'-amino-4',5'-dimethoxy - 2 - (methylsulfinyl)acetophenone. The material was recrystallized from ethyl acetate with the aid of charcoal, M.P. 145–47°; yield 30 g. (47%).

*Analysis.*—Calcd. for $C_{10}H_{13}NO_2S$ (percent): C, 56.85; H, 6.20; N, 6.63; S, 15.18. Found (percent): 56.98; H, 6.21; N, 6.49; S, 15.02.

EXAMPLE 5

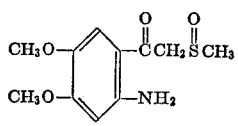

2'-amino-4',5'-dimethoxy-2-(methylsulfinyl)acetophenone

To a mixture of 1 l. of benzene and 500 ml. of DMSO was added 40 g. of NaH (55% in mineral oil). The mixture was heated with stirring at ca. 78° on a water bath under a stream of nitrogen. After 2 hr. hydrogen evolution had ceased, and the solution was clear. The solution was cooled to 25° and 40 g. of ethyl 3,4-dimethoxy anthranilate was added with stirring. The temperature rose to 32°. The mixture was stirred for 45 min. and diluted to 5 l. with anhydrous ether. The precipitated material was filtered, washed with anhydrous ether, and dissolved in 500 ml. of H₂O. The aqueous solution was adjusted to ca. pH 6 with glacial acetic acid, and the oil that precipitated was extracted with five 100 ml. portions of chloroform, Comb. extracts were dried over Na₂SO₄, and concentrated to a heavy oil under reduced pressure. On cooling the oil crystallized. It was recrystallized from abs. EtOH, M.P. 162–64°; yield 34 g. (50%).

*Analysis.*—Calcd. for C₁₁H₁₅NO₄S (percent): C, 51.35; H, 5.88; N, 5.44; S, 12.64. Found (percent): C, 51.54; H, 5.97; N, 5.30; S, 12.63.

EXAMPLE 6

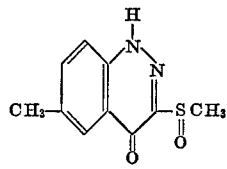

6-methyl-3-(methylsulfinyl)-4(1H)-cinnolinone

This compound was prepared by diazotizing a solution of 18.5 g. of 2'-amino-5'-methyl - 2 - (methylsulfinyl) acetophenone in 500 ml. of 1 N HCl with 6.3 g. of NaNO₂ in analogous fashion to 6-chloro - 3 - (methylsulfinyl)-4(1H)-cinnolinone. The material was recrystallized from DMF, M.P. 265–67°; yield 15 g. (77%).

*Analysis.*—Calcd. for C₁₀H₁₀N₂O₂S (percent): C, 54.04; H, 4.54; N, 12.60; S, 14.43. Found (percent): 53.82; H, 4.63; N, 12.60; S, 14.56.

EXAMPLE 7

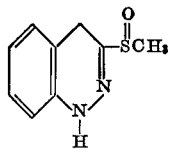

3-(methylsulfinyl)-4(1H)-cinnolinone

A solution of 5.0 g. (0.025 mole) of 2'-amino-2-(methylsulfinyl)-acetophenone, 30 ml. (0.03 mole) of cold (15° C.) 1 N hydrochloric acid and 100 ml. of cold water cooled to 5° C. A solution of 2.07 g. (0.03 mole) of sodium nitrite in 10 ml. of water was added over a period of 3 minutes with stirring, keeping the temperature at 5° C. A deep red color developed as yellow solid separated. The mixture was allowed to warm up to 20° C. After 15 minutes at 20° the product was filtered, washed with water, 2-propanol and then ether. Wt. 5.0 g. (64%) M.P. 266–269°. Recrystallization from N,N-dimethylformamide gave pure, white crystals melting at 274–276° C.

*Analysis.*—Calcd. for C₉H₈N₂O₂S (percent): C, 51.91; H, 3.87; N, 13.45. Found (percent): C, 51.89; H, 3.98; N, 13.41.

EXAMPLE 8

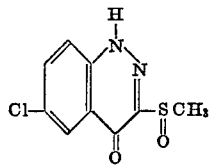

6-chloro-3-(methylsulfinyl)-4(1H)-cinnolinone 500 ml. of 3 N HCl was chilled to 0° in an ice-salt bath, and 10 g. of 2'-amino-5'-chloro-2-(methylsulfinyl)aceto- phenone was added. The mixture was stirred until a clear solution was obtained, and a solution of 3.45 g. of NaNO₂ in 20 ml. of H₂O was added with stirring at ca. 0–3°. The solution became first orange colored, and then a yellow precipitate formed. The ice bath was removed, and the mixture was stirred until room temperature was attained. The precipitate was filtered off, washed with H₂O, and recrystallized from dimethylformamide, M.P. 267–72°; yield 5 g. (44%).

*Analysis.*—Calcd. for C₉H₇ClN₂O₂S (percent): C, 44.54; H, 2.91; N, 11.54; S, 13.21. Found (percent): C, 44.62; H, 2.98; N, 11.54; S, 12.96.

EXAMPLE 9

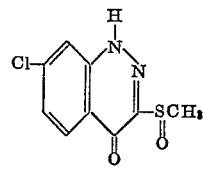

7-chloro-3-(methylsulfinyl)-4(1H)-cinnolinone

This was prepared in analogous fashion to 6-chloro-3-(methylsulfinyl)-4(1H)-cinnolinone by diazotizing a suspension of 11 g. of 2'-amino-4'-chloro-2-(methylsulfinyl) acetophenone in 250 ml. of 1 N HCl with 3.5 g. of NaNO₂. The material was recrystallized from dimethyl formamide M.P. 285–90°; yield 10 g. (87%).

*Analysis.*—Calcd. for C₉H₇ClN₂O₂S (percent): C, 44.54; H, 2.91; N, 11.54. Found (percent): C, 44.38; H, 3.07; N, 11.72.

EXAMPLE 10

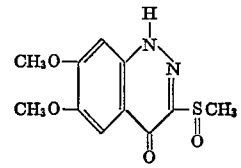

6,7-dimethoxy-3-(methylsulfinyl)-4(1H)-cinnolinone

A solution of 20 g. of 2' - amino-3',4'-dimethoxy-2-(methylsulfinyl) acetophenone in 250 ml. of 1 N HCl at 0° was treated dropwise with stirring at 0–5° with a solution of 5.6 g. of NaNO₂ in 30 ml. of H₂O. The solution became brown, and a peach colored precipitate formed. The mixture was allowed to warm up to room temperature and the precipitate was filtered, washed with cold H₂O, and recrystallized from dimethylformamide, M.P. 303–05°; yield 17 g. (81%).

*Analysis.*—Calcd. for C₁₁H₁₂N₂O₄S (percent): C, 49.25; H, 4.51; N, 10.44; S, 11.95. Found (percent): C, 49.37; H, 4.75; N, 10.56; S, 11.85.

EXAMPLE 11

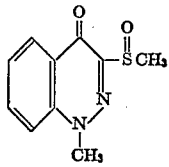

1-methyl-3-(methylsulfinyl)-4-(1H)-cinnolinone

Dimethylsulfate [12.5 g. (0.1 mole)] was added gradually to a vigorously stirred soltuion of 6.5 g. (0.0298 mole) of 3-methylsulfinyl)-4(1H)-cinnolinone in 120 ml. of 1 N sodium hydroxide solution at 30° C. The temperature rose to 40° as the suspended dimethyl sulfate gradually went into solution over a period of 15 minutes. After an additional one-half hour of stirring, potassium carbonate excess was added to salt-out an oil. The product was extracted into 800 ml. of methylene chloride, the solution was dried over $K_2CO_3$, charcoaled, filtered and concentrated. Wt. 6.4 g. (96.7%) M.P. 187–189° C. Recrystallization from 2-propanol-petroleum ether gave pure material, M.P. 189–191° C.

Analysis.—Calcd. for $C_{10}H_{10}N_2O_2S$ (percent): C, 54.04; H, 4.54; N, 12.60; S, 14.43. Found (percent): C, 54.00; H, 4.55; H, 12.53; S, 14.67.

EXAMPLE 12

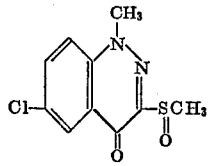

6-chloro-1-methyl-3-(methylsulfinyl)-
4(1H)-cinnolinone

To a solution of 10 g. of 6-chloro-3-(methylsulfinyl)-4(1H) cinnolinone in 160 ml. of 1 N NaOH, was added 15 g. of $(CH_3)_2SO_4$ with stirring. The temperature rose to ca 36°, and a thick pasty precipitate formed. After the mixture was allowed to stand for 0.5 hr., it was filtered. The solids were washed with $H_2O$, and recrystallized from abs. ethanol, M.P. 231.5–34.5° yield 6 g. (60%).

Analysis.—Calcd. for $C_{10}H_9ClN_2O_2S$ (percent): C, 46.79; H, 3.53; N, 10.91; S, 12.49. Found (percent): C, 47.04; H, 3.60; N, 11.20; S, 12.49.

EXAMPLE 13

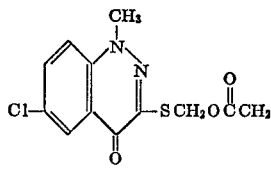

[(6-chloro-1,4-dihydro-1-methyl-4-oxo-3-
cinnolinyl)thio]methanol acetate

A mixture of 8 g. of 6-chloro-1-methyl-3-(methylsulfinyl)-4(1H) cinnolinone and 30 ml. of acetic anhydride was refluxed for 2½ hrs. The resulting solution was allowed to stand at room temperature overnight. The crystalline precipitate was filtered off, washed with Skelly B, and recrystallized from $CH_3CN$, M.P. 191–92°; yield 6 g. (65%).

Analysis.—Calcd. for $C_{12}H_{11}ClN_2O_3S$ (percent): C, 48.25; H, 3.71; N, 9.38; S, 10.73. Found (percent): C, 48.22; H, 3.67; N. 9.59; S, 10.47.

EXAMPLE 14

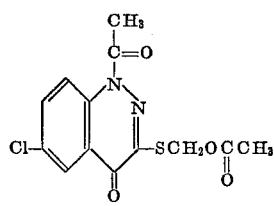

[(1-acetyl-6-chloro-1,4-dihydro-4-oxo-3-cinnolinyl)thio]
methanol acetate

A mixture of 12 g. of 6-chloro-3-(methylsulfinyl)-4-(1H)-cinnolinone and 100 ml. of acetic anhydride was refluxed for 3 hours. The solution was chilled, and the crystalline precipitate filtered off, washed with Skelly B, and recrystallized from ethyl acetate, M.P. 148–50°; yield 4 g. (24.5%).

Analysis.—Calcd. for $C_{13}H_{11}ClN_2O_4S$ (percent): C, 47.79; H, 3.39; N, 8.57; S, 9.81. Found (percent): C, 48.06; H, 3.54; N, 8.49; S, 10.02.

EXAMPLE 15

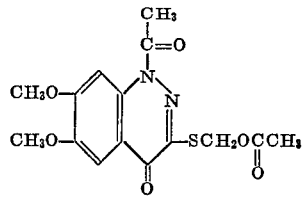

[(1-acetyl-1,4-dihydro-6,7-dimethoxy-4-oxo-3-cinnolinyl)
thio]methanol acetate

A mixture of 13 g. of 6.7-dimethoxy-3-(methylsulfinyl)-4(1H) cinnolinone and 500 ml. of acetic anhydride was refluxed for 3 hours. The resulting solution was chilled, and the precipitate was filtered off, washed with Skelly B, and recrystallized from $CH_3CN$, M.P. 208–209.5°; yield 11 g. (63%).

Analysis.—Calcd. for $C_{15}H_{16}N_2O_6S$: (percent): C, 51.13; H, 4.58; N, 7.95; S, 9.10. Found (percent): C, 51.25; H, 4.65; N, 8.12; S, 9.28.

EXAMPLE 16

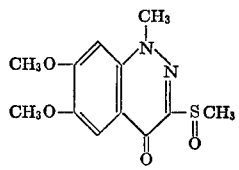

6,7-dimethoxy-1-methyl-3-(methylsulfinyl)-4(1H)-
cinnolinone

A solution of 10 g. of 6,7 - dimethoxy - 3 - (methylsulfinyl)-4(1H)-cinnolinone in 148 ml. of 1 normal NaOH was treated with 14 g. of $(CH_3)_2 SO_4$ with stirring. As the $(CH_3)_2SO_4$ dissolved, the temperature rose to ca. 35° and a pasty precipitate formed. The mixture was stirred for 45 minutes and the precipitate was filtered off, washed with cold $H_2O$ and recrystallized from $CH_3CN$, M.P. 262–64°; yield 6 g. (57%).

Analysis.—Calcd. for $C_{12}H_{14}N_2O_4S$ (percent): C, 51.05; H, 5.00; N, 9.92; S, 11.36. Found (percent): C, 51.32; H, 5.24; N, 10.13; S, 11.53.

EXAMPLE 17

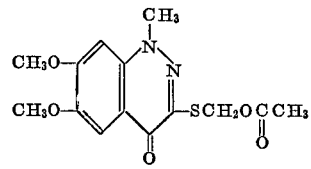

[(1,4-dihydro-6,7-dimethoxy-1-methyl-4-oxo-3-cinnolinyl)
thio]methanol acetate

A mixture of 11 g. of 6,7-dimethoxy-1-methyl-3-(methylsulfinyl)-4(1H)-cinnolinone and 100 ml. of acetic anhydride was refluxed for 2 hours. The solution was chilled, and the crystalline precipitate was filtered off, washed with Skelly B, and recrystallized from $CH_3CN$, M.P. 229–33°, yield 11 g. (87%).

Analysis.—Calcd. for $C_{14}H_{16}N_2O_5S$ (percent): C, 51.84; H, 4.97; N, 8.64; S, 9.89. Found (percent): C, 51.86; H, 5.09; N, 8.41; S, 10.03.

EXAMPLE 18

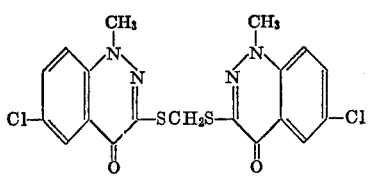

3,3'-methylenedithiobis(6-chloro-1-methyl-4(1H)-cinnolinone)

A mixture of 10 g. of [(6-chloro-1,4-dihydro-1-methyl-4-oxo-3-cinnolinyl)-thio]methanol acetate and 250 ml. of 3 N HCl was refluxed with stirring for 5 hours. The mixture was then chilled, and the precipitate filtered off washed with cold $H_2O$, and recrystallized from dimethylformamide, M.P. 352–54°; yield 5.5 g. (73%).

Analysis.—Calcd. for $C_{19}H_{14}Cl_2N_4O_2S_2$ (percent): C, 49.04; H, 3.03; N, 1204; S, 13.78. Found (percent): C, 49.23; H, 3.22; N, 12.24; S, 13.60.

EXAMPLE 19

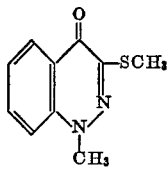

1-methyl-3-(methylthio)-4(1H)-cinnolinone

A mixture of 0.4 g. (0.0018 mole) of 1-methylsulfinyl)-4(1H)-cinnoline, 50 ml. of water and 3.5 g. of Raney nickel was boiled with stirring for 10 minutes. The cooled reaction mixture was filtered. Then Raney nickel was extracted with 50 ml. of methylene chloride. The dried ($K_2CO_3$) extract concentrated to give 10 mg. (2.7%) of yellow crystals melting at 173–175°. Recrystallization from benzene-petroleum ether gave pure material, M.P. 175–177° C.

Analysis.—Calcd. for $C_{10}H_{10}N_2OS$ (percent): C, 58.23; H, 4.89; N, 13.58. Found (percent): C, 58.44; H, 4.90; N, 13.64.

EXAMPLE 20

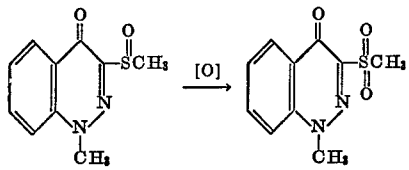

1-methyl-3-(methylsulfonyl)-4(1H)-cinnolinone

A quantity of 6.16 g. (0.027 mole) of 85% m-chloroperbenzoic acid was added to a solution of 6.6 g. (0.03 mole) of 1-methyl-3-(methylsulfinyl)-4(1H)-cinnolinone in 100 ml. of chloroform. The temperature rose to 45° C. After 5 minutes the solution was brought to reflux for 5 minutes, cooled, mixed with 200 ml. of 5% sodium bicarbonate and stirred for 10 minutes. Additional chloroform (300 ml.) was added to dissolve the separated product. The organic layer was separated, dried over anhydrous potassium carbonate and concentrated to give 6.7 g. (94.4%) of white product melting at 202–204°. Recrystallization from chloroform-methanol gave pure product melting at 204–206° C.

Analysis.—Calcd. for $C_{10}H_{10}N_2O_3S$ (percent): C, 50.41; H, 4.23; N, 11.76. Found (percent): C, 50.46; H, 4.30; N, 11.80.

EXAMPLE 21

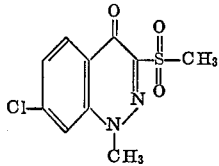

7-chloro-1-methyl-3-(methylsulfonyl)-4(1H)-cinnolinone

This was prepared by oxidizing a solution of 10 g. of 7-chloro-1-methyl-3-(methylsulfinyl)-4(1H)-cinnolinone in 500 ml. of $CHCl_3$ with 7.5 g. of m-chloroperbenzoic acid in analogous fashion to 1-methyl-3-(methylsulfonyl)-4(1H)-cinnolinone. The material was recrystallized from $CH_3CN$, M.P. 270–72°; yield 7.5 g. (71%).

Analysis.—Calcd. for $C_{10}H_9ClN_2O_3S$ (percent): C, 44.04; H, 3.33; N, 10.27; S, 11.76. Found (percent): C, 44.32; H, 3.22; N, 10.29; S, 12.05.

EXAMPLE 22

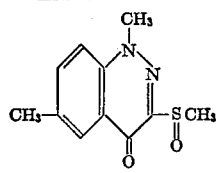

1,6-dimethyl-3-(methylsulfinyl)-4(1H)-cinnolinone

This compound was prepared by reacting a solution of 8 g. of 6-methyl-3-(methylsulfinyl)-4(1H)-cinnolinone in 145 ml. of 1 N NaOH with 13.5 g. of dimethylsulfate in analogous fashion to 1-methyl-3-(methylsulfinyl)-4(1H)-cinnolinone. The material was recrystallized from ethyl acetate, M.P. 173–75°; yield 5.5 g. (65%).

Analysis.—Calcd. for $C_{11}H_{12}N_2O_2S$ (percent): C, 55.91; H, 5.12; W, 11.86; S, 13.57. Found (percent): C, 56.19; H, 5.17; N, 11.97; S, 13.71.

We claim:
1. A compound which is 3-(methylsulfinyl)-4(1H)-cinnolinone.
2. A compound which is 6-chloro-3-(methylsulfinyl)-4(1H)-cinnolinone.
3. A compound which is 7-chloro-3-(methylsulfinyl)-4(1H)-cinnolinone.
4. A compound which is 6,7-dimethoxy-3-(methylsulfinyl)-4(1H)-cinnolinone.
5. A compound which is 1-methyl-3-(methylsulfinyl)-4(1H)-cinnolinone.
6. A compound which is 6-chloro-1-methyl-3-(methylsulfinyl)-4(1H)-cinnolinone.
7. A compound which is 6,7-dimethoxy-1-methyl-3-(methylsulfinyl)-4(1H)-cinnolinone.
8. A compound which is 1-methyl-3-(methylsulfonyl)-4(1H)-cinnolinone.
9. A compound which is 7-chloro-1-methyl-3-(methylsulfonyl)-4(1H)-cicolinone.
10. A compound which is 6-methyl-3-(methylsulfinyl)-4(1H)-cinnolinone.
11. A compound which is 1,6-dimethyl-3-(methylsulfinyl)-4(1H)-cinnolinone.

References Cited
FOREIGN PATENTS 411,908    5/1968    Japan _____ 260—250 A

OTHER REFERENCES

Chem. Abstracts, vol. 75 (1971), p. 289, para. 129743x.

Chem. Abstracts, vol. 73 (1970), p. 365, para. 13120m.

Yarnal, et al.: Chem. Abstracts 73:77174z (1970).

RALPH D. McCLOUD, Primary Examiner

U.S. Cl. X.R.

424—250